United States Patent [19]

Kromrey

[11] Patent Number: 5,073,443

[45] Date of Patent: * Dec. 17, 1991

[54] THERMAL BARRIER FOR HIGH TEMPERATURE MOLDING

[75] Inventor: Robert V. Kromrey, Campbell, Calif.

[73] Assignee: United Technologies Corporation, Hartford, Conn.

[*] Notice: The portion of the term of this patent subsequent to Nov. 14, 2006 has been disclaimed.

[21] Appl. No.: 288,934

[22] Filed: Dec. 23, 1988

Related U.S. Application Data

[62] Division of Ser. No. 138,738, Dec. 28, 1987, Pat. No. 4,983,345.

[51] Int. Cl.$^5$ .................. B32B 5/14; B32B 5/16; B32B 18/00
[52] U.S. Cl. .................. 428/313.7; 428/304.4; 428/323; 428/325; 428/402; 428/313.9
[58] Field of Search .............. 428/323, 325, 402, 332, 428/304, 306, 308, 309

[56] References Cited

U.S. PATENT DOCUMENTS

| | | | |
|---|---|---|---|
| 4,104,102 | 8/1978 | Eagon et al. | 428/40 X |
| 4,713,295 | 12/1987 | Laroche | 428/406 |
| 4,880,688 | 11/1989 | Kromrey | 428/141 |

Primary Examiner—Lorraine T. Kendell

[57] ABSTRACT

This invention is directed to a thermal barrier layer particularly adapted for insulating a solid flowable particulate polymeric pressure transfer medium from elevated temperatures during high temperature molding. A method useful with the thermal barrier comprises transferring pressure from a pressure means via the thermal insulation layer to an article and exposing the article to temperatures of about 316° C. to about 1371° C. An exemplary thermal barrier comprises at least two flexible layers of beads having a thermal insulation of less than about 2 k.

18 Claims, 2 Drawing Sheets

THERMAL BARRIER FOR HIGH TEMPERATURE MOLDING

This is a division of copending application Ser. No. 07/138,738 filed on Dec. 28, 1987, U.S. Pat. No. 4,983,345.

TECHNICAL FIELD

The field of art to which this invention pertains is molding apparatus and methods and particularly insulating materials and methods of using same.

BACKGROUND ART

There are a variety of methods of molding articles. These include autoclaves, hydroclaves and compression molding. Particularly for high temperature molding (e.g., polyimide resins) one isostatic molding process has shown great advantage over other methods. This method is described in commonly assigned European Patent Application No. 87630010.4 entitled "Molding Method and Apparatus Using a Solid, Flowable, Polymer Medium" to Kromrey. An article is molded by contacting it with a solid polymer medium, such as an especially low strength unfilled silicone rubber which is solid and able to flow readily. Thermal expansion of the medium or mechanical force is used to create molding pressure and thereby provides a substantially uniform pressure on the article precursor. Various temperature and pressure cycles can be attained; constant high pressures can be maintained on the article precursor during cooldown, optionally aided by flowing of medium to and from a vessel in which the article precursor is being molded. The method is particularly adapted to molding filler or fiber reinforced thermosetting polymer composite articles. However, at extreme temperatures, some pressure transferring material may degrade resulting in an oily residue which can be intrusive.

Although there are a wide variety of molding techniques (e.g., isostatic) there is a continual search for improved methods.

DISCLOSURE OF INVENTION

This invention is directed to a thermal barrier layer particularly adapted for insulating a solid flowable particulate polymeric pressure transfer medium from elevated temperatures during high temperature molding. The thermal barrier comprises at least two flexible layers of beads having a thermal insulation of at less than about 2 k.

Yet another aspect of this invention relates to a method of molding an article by applying pressure to the article through a thermal insulation layer. The method comprises transferring pressure from a pressure means via a thermal insulation layer to the article and exposing the article to temperatures of about 316° C. to about 1,371° C.

This invention makes a significant contribution to the field of molding articles by providing thermal barriers that insulate pressure transfer means such as solid flowable polymers or silicone vacuum bags against exposure to elevated temperatures.

The foregoing and other features and advantages of the present invention will become more apparent from the following description and accompanying drawing.

BEST MODE FOR CARRYING OUT THE INVENTION

Figure 1:
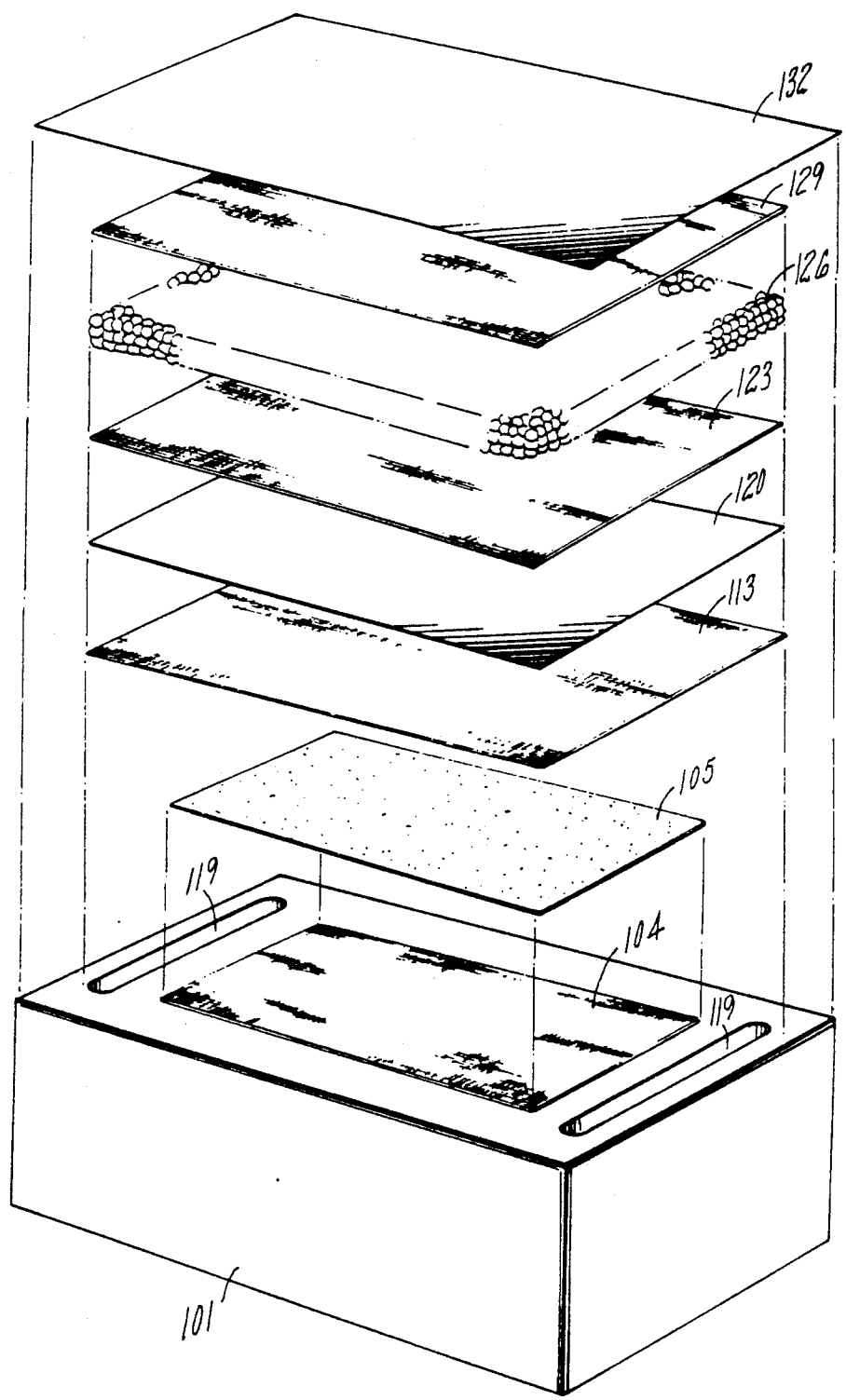
FIG. 1 illustrates a perspective view of a composite during molding conditions using an exemplary insulating material of this invention.

A clearer understanding of this invention may be had by reference to FIG. 1. An article 104 to be molded (e.g., prepreg) is disposed next to a tool 101 (e.g., steel, copper, aluminum form). Typically, a porous release material 105 is disposed between the part 104 and subsequent layers to aid in post molding separation. A breather layer 113 may be disposed next to the release layer 105 and serves as the main lateral fluid flow path for liquids and gases (e.g., given off from the part 104 during curing) as they are drawn to a vent 119 in the tool 101. Typically, a vacuum bag 120 envelops the above assembly separating it from the insulating layer (described hereafter) although the separation is not a necessity. A layer of glass fabric 123 or some other material may be used to separate the insulating layer 126 from the prior layers so that any surface perturbations of the insulating layer 126 are not transferred during pressure molding to the article 104 or do not result in a break in the vacuum bag 120. The insulating layer 126 is disposed between the part 104 which is heated by the tool 101 and the pressure means to protect the pressure means (e.g., solid flowable polymer media described hereinafter) from elevated temperatures. Alternatively, the insulating layer 126 may be used to protect any layers, articles or apparatuses, from elevated temperatures. Another layer of glass fabric 129 or some other material may be used to separate the insulating layer 126 from the subsequent layers so that any surface unevenness of the insulating layer 126 does not result in damage to any subsequent layers. Another vacuum bag 132 may envelop the entire assembly separating it from the pressure means.

Any good insulating material that withstands temperatures of up to about 316° C. (600° F.) up to about 1,371° C. (2,500° F.) may be used in this invention. This ensures the integrity of the thermal barrier for high temperature molding. Typically, thermal insulation of less than about 2 k (BTU in./hr °F. ft$^2$), preferably less than about 1 k provides sufficient insulation for many applications. Preferably the material is capable of transferring a substantially uniform pressure (e.g., pressure differentials less than about 10%) when used in conjunction with the solid flowable media described hereinafter. It is also preferred that a porous material whose voids withstand pressures of about 1.38 MPa (200 psi) to about 20.7 MPa (3,000 psi) may be used as the thermal barrier of this invention. It is preferred that the porous barrier layer's voids have a total volume of at least about 25%. This provides insulative protection and may be used for cooling if fluids (e.g., cool air) are passed through the thermal barrier. It is also preferred that the thermal barrier layer is flexible as this facilitates the forming of the thermal barrier layer around composite prepreg surfaces having compound curvatures.

It is preferred that the thermal barrier layer is about 1 cm to about 10 cm in thickness because these thicknesses typically provide a sufficient thermal drop without seriously inhibiting substantially uniform pressure transfer. It is preferred that the thermal barrier layer be relatively uniform in thickness to ensure uniform pressure application. Exemplary thermal barriers include powders such as carbon black, ceramics (e.g., zirconia), alumina and magnesia. An especially preferred thermal barrier layer comprises at least two layers of substantially spherical beads that are joined together to form an integral structure. Two layers ensure an insulative void volume. It is also preferred the insulating layer has a fluid path for the transfer of cooling fluids.

Substantially, spherical particles, such as glass beads, are an excellent insulator and provide voids for insulation and passage of cooling gases. By substantially spherical is meant an aspect ratio of less than about 2. Spherical beads can withstand very high compression loadings (e.g., 525 MPa, 70,000 psi). The contact points between individual beads offer a very small heat path through a multibead layer. After pressure has been applied, a relatively constant contact area is ensured. Deformation of the beads will cause a little higher heat transfer rate, but they will be effective until they fracture. An advantage of the spherical bead insulation is the large void volume, even when packed. Theoretical close packing of beads is based on several models. Void volumes for several models are as follows: face-centered cubic—26%; hexagonal close packed—26%; and body centered cubic—32%. For real world applications, beads settle in a random mix of packing patterns. In addition, slight movements of packs result in changes to packing patterns. Also, because beads are rarely perfectly round, void volumes are increased. When tightly packed, commercial beads have a void volume of about 30% to about 40%, typically about 37% when they are all nearly the same size.

A low temperature fluid (e.g., air) filling or flowing into or through the voids will provide good insulative properties. Alternatively, filling of the void volume with a powdered radiation blocker reduces the radiative heat transfer. Additional and/or alternative benefit is obtained if the void volume, whether or not it is filled with powder, is evacuated as that reduces convective heat transfer.

Beads may be made of materials other than glass, such as steel shot and ceramics. The glass beads may also be hollow spheres, such as microballoons, if their compressive strength is adequate for the application (e.g., pressures desired). Both hollow beads and ceramic beads will provide additional insulation. Hollow glass, silica or ceramic spheres are excellent insulators as they are filled with gas. In addition, the void volume between the spheres provides additional insulation value which can be as much as that obtained with any within the spheres. Collectively, the total void content can be from 20% to 80% which includes the internal void volume of the spheres. Thermal conductivity of the insulation layer can be about 2 k or less with Eccospheres No. FA-B ceramic microballoons from Emmerson-Cumming (Canton, Mass.). In addition, the beads may be coated with either a radiation reflective or absorbing coating to aid with insulation. Exemplary reflective coatings include metallic, chrome, aluminum, nickel and copper. Reflective coatings may transform to absorptive coatings during use and thus still remain insulative (e.g. copper to copper oxide). Exemplary absorptive coatings include copper oxide, carbon black and high temperature paint. Yet another radiation blocking alternative is opaque beads. Conventional glass beads are suitable for use at temperatures near their softening point, 816° C. (1,500° F.). Special glasses will increase the use temperatures (e.g., several hundred degrees). Exemplary glass beads are 3,000 (TM) beads and 3,000E (TM) beads available from Potters Industries (Hasbrook Heights, N.J.).

In addition, any combination of the above coated, hollow etc. beads may be used (e.g., alternate layers) depending on the desired application, cost, etc.

At least one layer of very small size beads may be disposed on one or both sides of the insulative bead layer. This layer(s) would follow the filling of the irregular large bead surface with the smaller beads to form a reasonably flat surface. This aids in attaining a smooth surface on a molded part. The larger the beads that are near the molded part, the greater chance the molded part surface may have a dimpled look. In addition, these layers would protect any vacuum bag from rupturing if placed between the beads and vacuum bag. It is preferred that this bead layer is about 0.5 mm to about 1.7 mm because below about 0.5 mm, the flow path can become plugged and above 1.7 mm, the surface of the article to be molded may be made nonuniform by the molding pressure (unless intervening layers described below are used), although the part can be machined to provide a smooth surface.

In addition, or as an alternative to the small bead layer described above, a thin layer of material (e.g., fabric, padding) (e.g., #1581 fabric available from Airtech International, Carson, Calif.) about 0.2 mm (0.009 inch) to about 0.6 mm (0.027 inch) in thickness may be disposed on one or both sides of the insulative layer to provide a smoothing effect.

Typically, layers of a release material (e.g., ARMALON (TM) Teflon coated glass available from T.M.I. Inc.; Salt Lake City, Utah) may be used, for example, to facilitate release of the part from the breather material. Finally, a flexible multidirectionally stretchable porous material such as tricot stretch fabric may be bonded to one or both sides of the bead layers. This facilitates the flexibility of the bead layers because as a layer of beads is conformed to a curved surface, the flexible material distributes the bending load over a greater area of the bead layer and thus reduces fracture of the bead layer.

The above assembly may be contained within a vacuum bag (e.g., conventional silicone bag) or a metal foil barrier which can withstand high temperatures. The bag typically covers vent holes in the tool on which the part is being made. Although the barrier is typically referred to as gas impervious, small leaks may occur in a metal foil barrier, that is used with the solid flowable polymer pressure transfer media described below without deleterious effect. Typically, aluminum and copper foils or alloys thereof are used, depending on the maximum temperature of exposure with the solid flowable polymer pressure transfer media described below. Aluminum is preferred at temperatures up to about 538° C. (1,000° F.); copper may be used at temperatures between about 538° C. (1,000° F.) and about 816° C. (1,500° F.) when the aluminum foil would melt. Above about 816° C., high temperature alloys may be used.

Typically, the layer of beads must be held in place during the molding process or at least until the molding pressure becomes sufficient to prevent their displacement. This is a problem with articles having vertical or curved surfaces. To facilitate layup beads can be formed into pads which may be laid over the article to be molded as a blanket. The material used to contain the beads can be stitched to keep the beads from rolling into one place, with resultant bare areas. This would resemble a quilt.

An alternate preferred method for forming the pad is by lightly bonding the beads together. A flexible porous pad may be formed by applying a very thin layer of flexible adhesive, for example, PSA529 (TM) acrylic modified silicone (General Electric Co., Fairfield, Conn.) catalyzed with A-1100 (TM) catalyst, (Union Carbide, Danbury, Conn.) to a single layer of clean beads. Depending on the adhesive used, it may withstand the molding temperatures used. However, even if the adhesive does not withstand the molding temperature, once the beads are in place, they may be held in place by the pressurizing means used (e.g., solid flowable polymer described hereinafter). The beads are uniformly spread in a form to confine them. After air-drying, an excess of clean beads is poured onto the previous layer. This addition is made while the uncured resin is still tacky. An exemplary adhesive thickness is approximately 0.008 mm (0.0003 inches). But the adhesive may be thicker (e.g., 0.025 mm) or thinner (e.g., 0.005 mm) as required for larger or smaller beads. Excess beads may be removed from the surface by inverting the sheet after the adhesive has dried to a good tack. Additional adhesive can be sprayed over the surface of the above-described bead layer for bonding to another bead layer. After minimal drying, more beads may be poured over the surface; the solvent allowed to evaporate, and the excess beads poured off. This technique can be repeated until the desired bead layer thickness is attained.

Yet another preferred method comprises completely coating a quantity of beads by immersion in a dilute solution of the adhesive mixture. The beads are drained and then poured into a casting frame for drying. Removal of any residual liquid may be accomplished through a porous layer of fabric under the frame. This layer is removed after the adhesive has set sufficiently to hold the beads together as a pad. After the final addition of beads, the pad is placed in a circulating air oven to cure the adhesive. The adhesive can be formulated to remain tacky enough to enable it to be a pressure sensitive stock. It is then capable of easily sticking to any surface, including itself. Layup is simplified because the pad adheres to the outside of the article to be molded.

Sheets (e.g., pads) of the beads are easily cut into shapes to fit over an article. The flexible cured sheets can be contoured and butt spliced to form a continuous breather layer.

These breather layers may be used in conjunction with a variety of conventional pressure causing or transferring means in order to mold a composite article. Examples include pressure pads, silicone bags and platen presses. A preferred pressure causing/transferring means is the solid flowable media and methods described in European Patent Application No. 87630020.4 entitled "Molding Method and Apparatus Using a Solid, Flowable, Polymer Medium" by Kromrey, the disclosure of which is hereby incorporated by reference and in commonly assigned U.S. application Ser. No. 829,048 entitled "Molding Method and Apparatus Using a Solid Flowable, Polymer Medium", the disclosure of which is hereby incorporated by reference. The preferred solid flowable polymer material is further described in U.S. Pat. No. 4,686,271 entitled "Hydraulic Silicone Crumb" by Beck et al, the disclosure of which is hereby incorporated by reference.

The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of $-4+30$ U.S. mesh sieve size (4.7–0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. Preferred materials which have been used thus far are the experimental unfilled silicone rubber materials designated as X5-8017, formerly No. 6360 B1 (more simply 8017 hereinafter), X5-8023 and X5-8800 by the Dow Corning Corporation (Midland, Mich.).

Another Dow Corning silicone rubber, No. 93-104, without lists ordinary fillers (called "93-104" herein, nonetheless) is useful. The Polygel C-1200 silicone rubber Stauffer Chemical Company, Westport, Conn. U.S.A.), believed to be essentially the material which is described in the Bruner Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g., 316° C. (600° F.) 482° C. (900° F.)).

Most silicone rubbers are temperature limited for long term use, e.g., typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

The preferred 8023 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also be observed that preferred polymer useful with the present invention forced through a small orifice, or through a 1.1 cm diameter pipe as described below, has a tendency to disintegrate into smaller particulate. By example, it is found that over time, a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1,500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 6360 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with medium having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination are necessary. On the contrary, to a significant extent, it is believed there is a redundancy and that they independently characterize the invention.

Returning to the insulation layers, (that may be used with the above-described pressurizing means, these insulation layers are used in conventional processes to protect pressure means, etc. from elevated temperatures during molding. Typically, pressure applied by the means described above and optionally heat is applied to the article causing fluids (gases or liquids) to be released from the article. Fluids are typically vented through a breather layer to a vent which is connected to a vacuum line. Typically, the article precursor is exposed to elevated temperatures at about 121° C. (250° F.) to about 468° C. (875° F.) and even higher in order to cure the article precursor. Preferably, pressures of about 0.01 MPa (15 psi) to about 21 MPa (3,000 psi) are applied to the article. The pressures and temperatures vary depending upon the particular article to be cured, its composition, size, etc.

Figure 2:
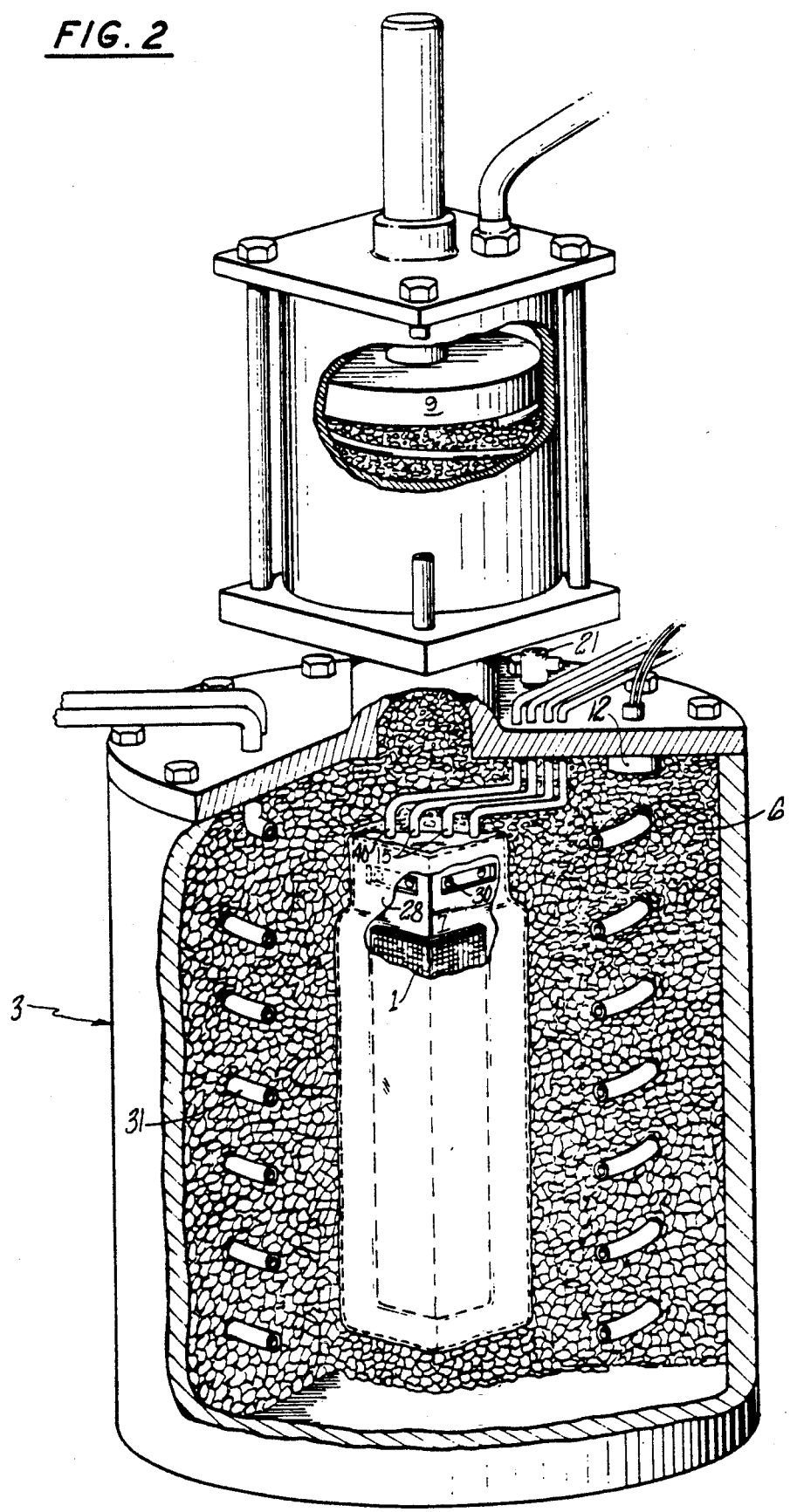
FIG. 2 illustrates a perspective view cutaway of an apparatus for performing the molding method of the present invention by controlling the temperature and pressure of the pressurizing medium.

FIG. 2 illustrates an especially preferred method according to the present invention, using the solid flowable media (described earlier) as a pressurizing means. Preimpregnated fibers or woven fabric layups are formed (e.g., by weaving, filament winding and tape wrapping) from fibers. The layups are impregnated with a resin (e.g., phenolic). At least two (a plurality) of the prepreg plies 1 are stacked and placed in a pressure vessel 3 (e.g., stainless steel, alloy steel) and surrounded with a polymer medium (medium) 6.

A barrier layer 28 is disposed between the medium and the article to avoid contamination of the composite and medium. Unlike a vacuum bag, this layer does not have to be air tight. An exemplary material is conventional aluminum foil. The barrier layer covers the insulation assembly described in FIG. 1 (e.g., release layer, breather). Typically, the breather is in communication with a vacuum line 40 via gas vent 30. This may be used to remove volatiles from the article. The medium may be in contact with more or less of the composite precursor as is desired. Typically, the surface area of the composite precursor 1 not in contact with the medium is disposed (e.g., in contact) next to a tool 7 in order to provide (or maintain) a particular shape to the article 1. A pressurizer (e.g., mechanical piston) 9 can apply the requisite, uniformly distributed medium pressure to the article precursor. However, the pressure is preferably accomplished via the thermal expansion of the polymer medium 6. Such things as conventional pressure transducers 12 can be inserted in various places within the pressure vessel 3 to detect the requisite pressure. While any pressure can be used with the present invention, typically pressures up to 20.67 MegaPascals (MPa) (3,000 psi) are used. However, it is believed pressures up to 138 MPa (20,000 psi) could be used.

Resistance heaters 15 are used to form (e.g., cure, carbonize, etc.) the composite to be molded 1. By raising the temperature of the tool, the heat is transferred to the article. Preferably, a fluid heating/cooling means 31 is used to change the pressure via the large thermal expansion of the pressurizing medium. Typically, the temperature used to expand the pressurizing medium is much less than that used to cure the article precursor. Regulation of the pressure increase can be achieved through a relief valve 21, piston 9 and/or fluid heating/cooling means 31. Thus, tubing 31 can be used alternately to heat or cool the medium depending on whether hot or cold fluids are passed independently of the temperature in the cure region.

Example 0.18 cm. diameter beads available from Potters Industries (Hasbrook Heights, N.J.) were poured into a mold to form a bead layer that was three beads thick. The bead layers were sprayed with SR529 (TM) silicone resin adhesive (General Electric Co., Fairfield, Conn.) thinned with toluene. The mold and beads were heated in an oven at 121° C. for about 30 minutes. Two bead blankets were made: one with clear beads and one with beads sprayed with ACRVOC (TM) high temperature paint.

16 ply layups were made with EYMYD (TM) resin (Ethyl Corp., Baton Rouge, La.) and AS-4 (TM) graphite fabric (Hercules, Wilmington, Del.) fabric and placed on a steel mandrel having copper faces equipped with vents to aid in the removal of volatiles. Each layup was covered with ARMALON (TM) Teflon coated glass release fabric available from TMI Inc. (Salt Lake City, Utah). A layer of glass fabric was placed on the release covered layups. The above described bead blankets were placed on top of the glass fabric layers as the breather and insulation layers. The glass fabric and bead layers were in communication with the vents in the mandrel. Layers of glass fabric were placed on top of the glass beads and the assembly was covered with aluminum foil which was taped to the mandrel.

The mold assembly was covered with about 2.5 cm of 8800 polymer media and covered with an aluminum foil bag. The prepared mold assembly and polymer media was placed into a pressure vessel for processing. The vessel was filled with 8023 polymer medium. Heating was provided to the tool/mold assembly to properly cure the article. Heating and cooling were also provided to a control coil to maintain the desired pressure conditions.

The composite was cured as follows. Vacuum was applied when the temperature reached 85° C. (185° F.) to remove volatiles from the assembly. The temperature was increased to 157° C. (305° F.) and the vessel pressure was increased to 0.7 MPa (100 psi). Then the temperature was increased to 427° C. (800° F.). At 399° C. (750° F.) the vessel pressure was increased to 9.8 MPa (1,400 psi). The temperature, pressure, and vacuum were maintained at 427° C., 9.8 MPa and 635 mm Hg respectively for 120 minutes. The vessel was cooled to 232° C. (450° F.) and the pressure was reduced to 0.35MPa (50 psi) over 20 minutes. Then the vessel was allowed to reach ambient conditions. A visual inspection of the composite parts showed strong void-free parts.

Although this invention has been shown and described with respect to detailed embodiments thereof, it will be understood by those skilled in the art that various changes in form and detail thereof may be made without departing from the spirit and scope of the claimed invention.

I claim:

1. A thermal barrier layer particularly adapted for insulating a solid flowable particulate polymeric pressure transfer medium from elevated temperatures during high temperature molding comprising:
   at least two flexible layers of beads having a thermal insulation of less than about 2 k.
2. The thermal barrier layer as recited in claim 1 wherein said beads are bonded together with a flexible adhesive.
3. The thermal barrier layer as recited in claim 1 wherein said layer is about 1 cm to about 10 cm in thickness.
4. The thermal barrier layer as recited in claim 1 wherein said beads are hollow.
5. The thermal barrier layer as recited in claim 1 wherein said beads are filled with a gas.
6. The thermal barrier layer as recited in claim 1 wherein said beads are substantially spherical.
7. The thermal barrier layer as recited in claim 1 wherein said beads comprise glass, glass-ceramic or ceramic or a mixture thereof.
8. The thermal barrier layer as recited in claim 1 wherein said beads are thermally stable up to temperatures of about 1,371° C.
9. The thermal barrier layer as recited in claim 1 wherein said beads are coated with a radiation reflecting coating.
10. The thermal barrier layer as recited in claim 1 wherein said beads have a metallic coating.
11. The thermal barrier layer as recited in claim 1 wherein said beads have a radiation absorbing coating.
12. The thermal barrier layer as recited in claim 1 wherein said beads have a metallic oxide coating.
13. The thermal barrier layer as recited in claim 1 wherein said beads are opaque.

14. The thermal barrier layer as recited in claim 1 wherein said bead layers have voids.

15. The thermal barrier layer as recited in claim 14 wherein said voids are substantially filled with a radiation absorber.

16. The thermal barrier layer as recited in claim 1 wherein said thermal barrier layer has a layer of flexible material on at least one side for providing a substantially smooth surface to said thermal barrier layer.

17. The thermal barrier layer as recited in claim 1 wherein said beads are dimensionally stable at pressures up to about 21 MPa.

18. The thermal barrier layer as recited in claim 1 wherein said layer is capable of transferring substantially uniform pressures.

* * * * *